United States Patent
Takahashi et al.

(10) Patent No.: US 7,960,896 B2
(45) Date of Patent: Jun. 14, 2011

(54) PIEZOELECTRIC MOTOR AND CAMERA DEVICE

(75) Inventors: Hiroshi Takahashi, Yokohama (JP); Toshikatsu Akiba, Kisarazu (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 153 days.

(21) Appl. No.: 12/182,389

(22) Filed: Jul. 30, 2008

(65) Prior Publication Data

US 2009/0058227 A1   Mar. 5, 2009

(30) Foreign Application Priority Data

Aug. 1, 2007   (JP) .................. P2007-201080

(51) Int. Cl.
*H02N 2/04* (2006.01)
(52) U.S. Cl. ............ 310/323.01; 310/323.16
(58) Field of Classification Search .......... 310/323.01–323.21, 328
See application file for complete search history.

(56) References Cited

U.S. PATENT DOCUMENTS

| | | | | |
|---|---|---|---|---|
| 5,532,540 | A * | 7/1996 | Claeyssen et al. | 310/323.16 |
| 6,373,170 | B1 * | 4/2002 | Hills | 310/328 |
| 6,819,029 | B2 * | 11/2004 | Ohno et al. | 310/323.17 |
| 2002/0067105 | A1 * | 6/2002 | Kosaka et al. | 310/323.16 |
| 2004/0189969 | A1 * | 9/2004 | Mizuno | 355/67 |
| 2005/0127787 | A1 * | 6/2005 | Biegelsen et al. | 310/328 |

FOREIGN PATENT DOCUMENTS

| | | | |
|---|---|---|---|
| EP | 0704916 | * | 3/1996 |
| EP | 0707916 | * | 3/1996 |
| JP | 03-166081 | | 7/1991 |
| JP | 05-191988 | * | 7/1993 |
| JP | 2000-059674 | | 2/2000 |
| JP | 2002-101676 | | 4/2002 |
| JP | 2003-111457 | * | 4/2003 |

OTHER PUBLICATIONS

Machine translation of JP 05-191988 generated from the website of the Japanese Patent Office.*
Machine translation of JP 2003-111457 generated from the website of the Japanese Patent Office.*

* cited by examiner

*Primary Examiner* — Derek J Rosenau
(74) *Attorney, Agent, or Firm* — Turocy & Watson, LLP (57) ABSTRACT

A piezoelectric motor includes: a base; first and second piezoelectric elements that are provided symmetrically on the base to face with each other, the first and second piezoelectric elements actuating in opposite directions; first and second displacement enlarging mechanisms that respectively enlarge actuating displacements of the first and second piezoelectric elements through first and second levers that rotate around first and second fulcrums fixed to the base; first and second leaf springs that are respectively coupled to action points of the first and second levers at one ends thereof; and an actuating portion that is coupled to the other ends of the first and second leaf springs and swings in accordance with actuation of the first and the second piezoelectric elements, the actuating portion being urged against a driven member to actuate the driven member with a frictional force.

5 Claims, 11 Drawing Sheets

PIEZOELECTRIC MOTOR AND CAMERA DEVICE

RELATED APPLICATION(S)

The present disclosure relates to the subject matter contained in Japanese Patent Application No. 2007-201080 filed on Aug. 1, 2007, which is incorporated herein by reference in its entirety.

FIELD

The present invention relates to a piezoelectric motor and a camera device utilizing the piezoelectric motor, which actuates a driven member by a frictional force using a piezoelectric element.

BACKGROUND

Conventionally, in the field of an actuator controller system having a multi-degree-of-freedom in rotation, which is used for controlling orientation of a monitoring camera and for a joint mechanism of a robot, there has widely been used an actuator mechanism or a motor system with a configuration in which a plurality of single-degree-of-freedom type motors are serially stacked in multistage. From a viewpoint of a reduction in a size and an enhancement in accuracy, in some cases, there is employed a multi-degree-of-freedom type actuator mechanism or a multi-degree-of-freedom type motor system which has a support system using a gimbal mechanism or a joint mechanism and an actuator system using an electromagnetic motor provided separately form the support system. However, in a conventional actuator mechanism or motor system, the serial multistage stacking structure of the single-degree-of-freedom type motors serves as a basic configuration irrespective of the presence of the gimbal mechanism or the joint mechanism. Therefore, the conventional actuator controller system has a difficulty in simplifying its configuration and in reducing its overall size, which cannot always satisfy the required design.

In consideration of the situations, in recent years, attention has been given to a research and development of a spherical motor using a piezoelectric element. In particular, a piezoelectric motor for actuating a spherical member as a driven member by a frictional force using a piezoelectric unit has been expected as a spherical motor of a next generation having small-size and high accuracy.

As a conventional example of a typical application of a motor of this type, there has been known a digital camera that is configured as described in JP-A-2000-059674. The digital camera is provided with an imaging unit, and the imaging unit has: a unit body; a first support frame for supporting the unit body swingably in a vertical direction; a second supporting member for supporting the unit body rotatably in a horizontal direction; an actuator for rotating the unit body in each of vertical and transverse directions; and a position detector for detecting a rotating position of the unit body. The unit body is formed in a shape of a capsule having both cylindrical ends covered with a semispherical surface, and there is provided an imaging unit having an imaging lens on a center of one of the semispherical surfaces and an imaging element in a rear position from the imaging lens. Furthermore, the actuator is disposed to protrude from an upper position of a short side of the second supporting member, and a tip of the actuator is provided to be in contact with a center of the semispherical surface on a rear side of the unit body.

The actuator has a configuration in which a piezoelectric element such as PZT is placed on four side faces of an elastic member having a shape of a square pole, and furthermore, a lamination type piezoelectric element and an abutting piece are placed on an upper end face. The abutting piece is provided with a projection for abutting on the semispherical surface of the unit body.

The imaging unit is set to a predetermined position in which the imaging lens is not exposed from an opening portion in a camera body in a state in which a main switch of the camera is OFF, and the opening portion is shielded with the unit body so that the protection of the imaging lens and the shading of the imaging element are performed. When the main switch is turned ON, the imaging lens of the imaging unit is exposed from the opening portion so that a direction of an optical axis thereof is automatically set to a predetermined position in a front direction and a photographing operation can be performed. Thus, the imaging unit is controlled to be placed in the shielding position of the opening portion and the exposing position of the imaging lens depending on a change in a state of the main switch.

According to the configuration as described above, the actuator having the piezoelectric element has such a structure that the unit body is directly rotated and actuated in each of the vertical and transverse directions. Therefore, it is possible to eliminate the complexity of the conventional structure having the serial multistage stacking configuration of the single-degree-of-freedom motors, thereby expecting a small-sized and multi-degree-of-freedom actuator mechanism.

A similar configuration is also disclosed in JP-A-3-166081.

However, the gimbal mechanism generally has a shaft misalignment caused by a manufacturing process or an assembly process. In a driven member having a spherical shape, particularly, the processing of a rotating bearing portion is difficult to perform and there is a tendency that the shaft misalignment is apt to be generated. An actuating displacement of the piezoelectric element is very small and a frictional contact state of the driven member and the piezoelectric unit greatly varies by the influence of the shaft misalignment. As a result, the actuator characteristic of the piezoelectric motor becomes unstable in some cases. It is also possible to separately provide a mechanism for absorbing the shaft misalignment of the gimbal mechanism, however, Since the size of the whole device is increased, the mechanism would become unsuitable for an application of an actual product so that a design for reducing a size is hindered.

SUMMARY

According to a first aspect of the invention, there is provided a piezoelectric motor including: a base; first and second piezoelectric elements that are provided symmetrically on the base to face with each other, the first and second piezoelectric elements being respectively applied with AC driving voltages having a first frequency to actuate in opposite directions; first and second displacement enlarging mechanisms that respectively enlarge actuating displacements of the first and second piezoelectric elements through first and second levers that rotate around first and second fulcrums fixed to the base; first and second leaf springs that are respectively coupled to action points of the first and second levers at one ends thereof; and an actuating portion that is coupled to the other ends of the first and second leaf springs and swings in accordance with actuation of the first and the second piezoelectric elements, the actuating portion being urged against a driven member to actuate the driven member with a frictional force between the actuating portion and the driven member.

According to a second aspect of the invention, there is provided a camera device including: a camera module having a spherical driven portion and an imaging device provided in the spherical driven portion; and a piezoelectric motor that actuates the spherical driven portion to control the direction of the camera module, the piezoelectric motor including: a base; first and second piezoelectric elements that are provided symmetrically on the base to face with each other, the first and second piezoelectric elements being respectively applied with AC driving voltages having a first frequency to actuate in opposite directions; first and second displacement enlarging mechanisms that respectively enlarge actuating displacements of the first and second piezoelectric elements through first and second levers that rotate around first and second fulcrums fixed to the base; first and second leaf springs that are respectively coupled to action points of the first and second levers at one ends thereof; and an actuating portion that is coupled to the other ends of the first and second leaf springs and swings in accordance with actuation of the first and the second piezoelectric elements, the actuating portion being urged against the spherical driven member to actuate the spherical driven member with a frictional force between the actuating portion and the spherical driven member.

DETAILED DESCRIPTION OF THE EMBODIMENTS

Hereinafter, embodiments of the invention will be described with reference to the drawings. The same or similar components are described with the same reference numerals and repetitive description will be omitted. In the following description, upper, lower, left and right directions are assumed to be relatively defined, and do not need to be always coincident with a direction of a gravity.

First Embodiment

Figure 1:
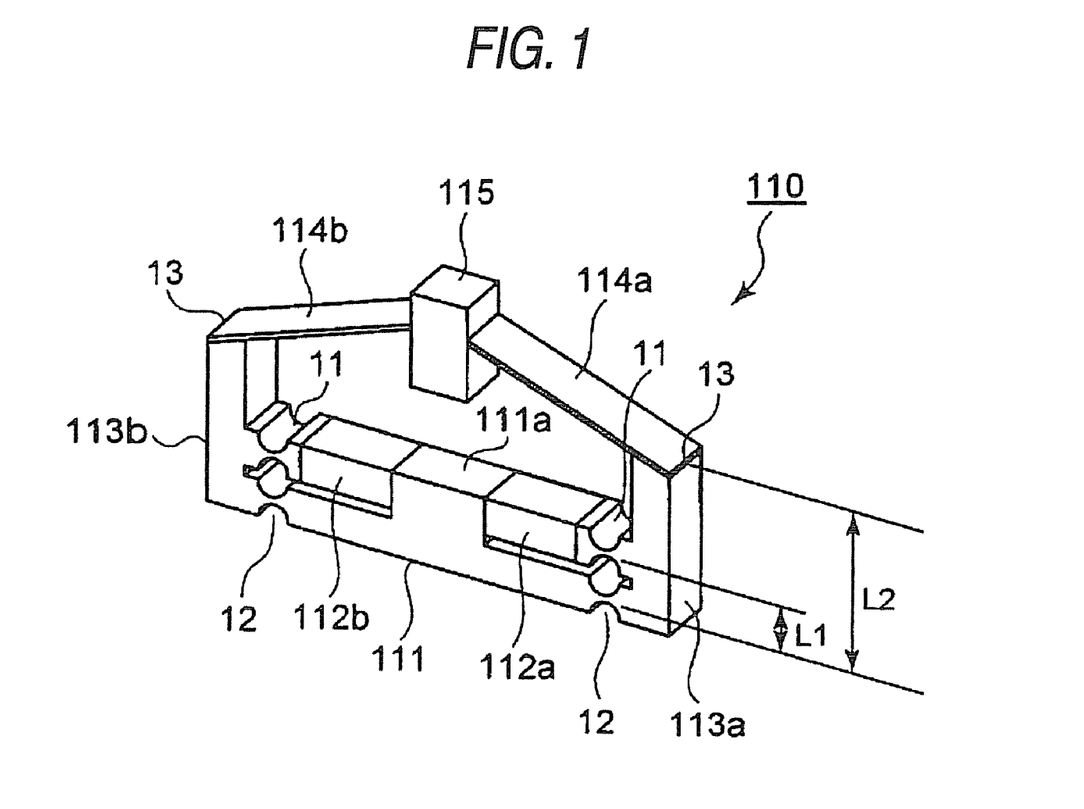
FIG. 1 is a perspective view showing a structure of a piezoelectric motor according to a first embodiment of the present invention.
Figure 2:
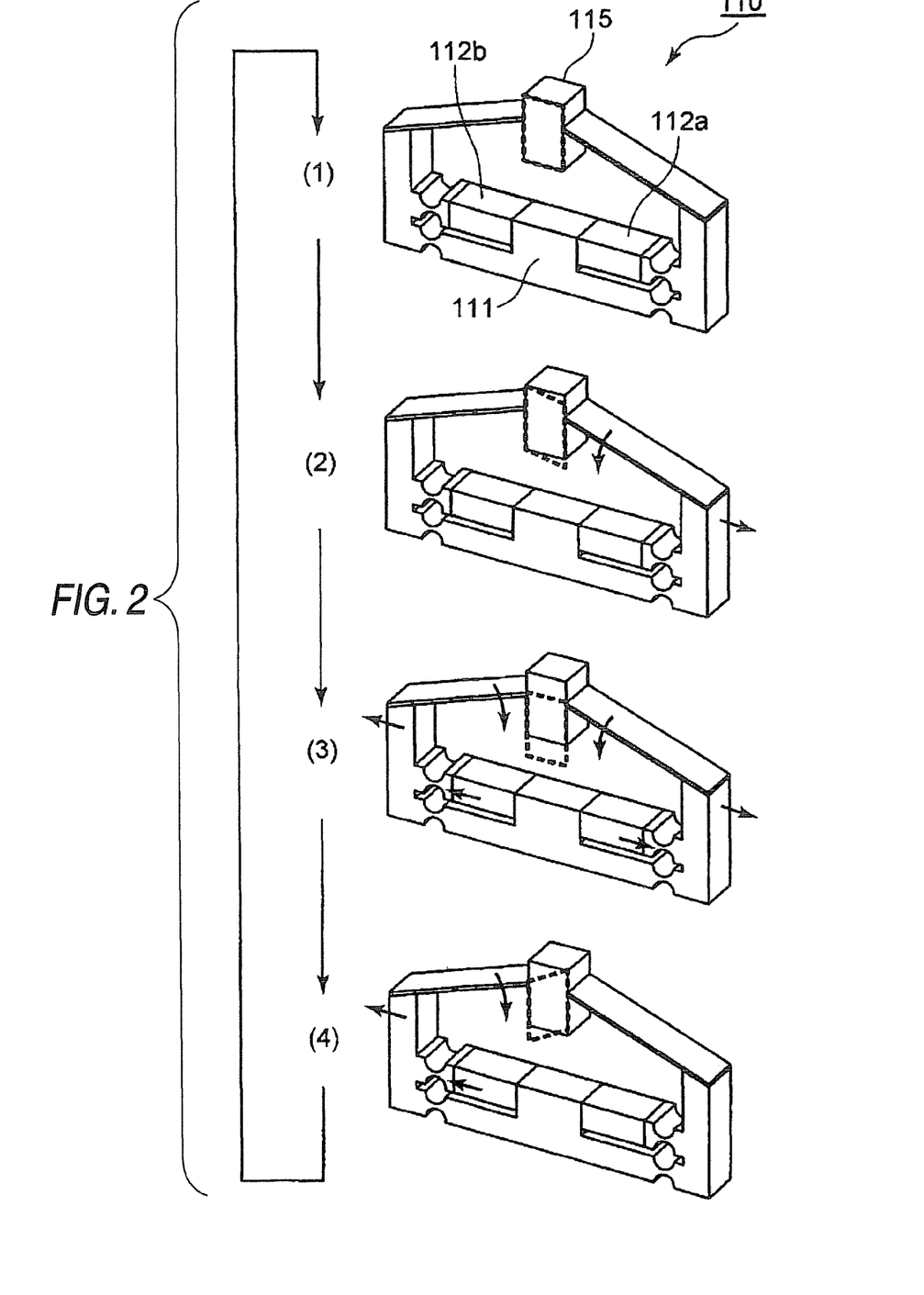
FIG. 2 is a view for explaining an operation of the piezoelectric motor in FIG. 1, illustrating a moving direction of each portion from a first state (1) to a fourth state (4)
Figure 3:
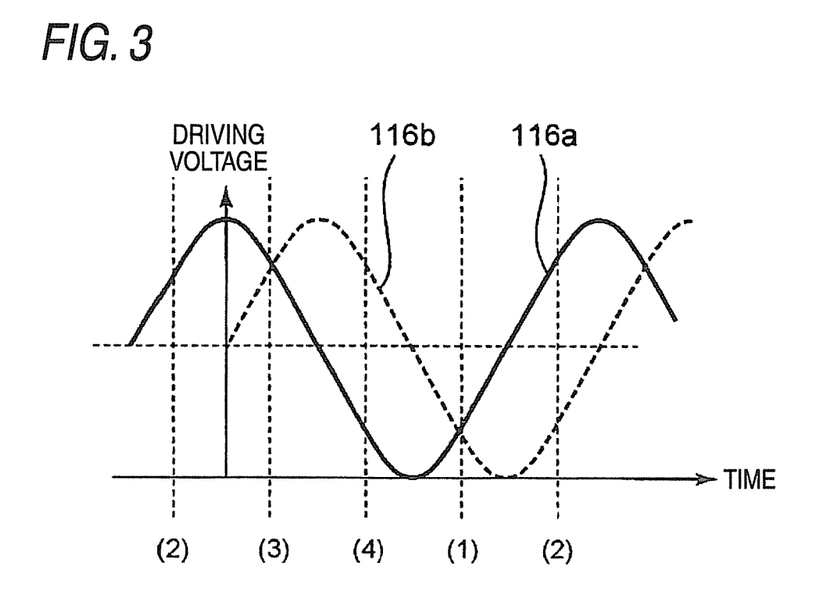
FIG. 3 is a graph showing a temporal variation in a driving voltage to be applied to a piezoelectric element of the piezoelectric motor shown in FIG. 1.
Figure 4:
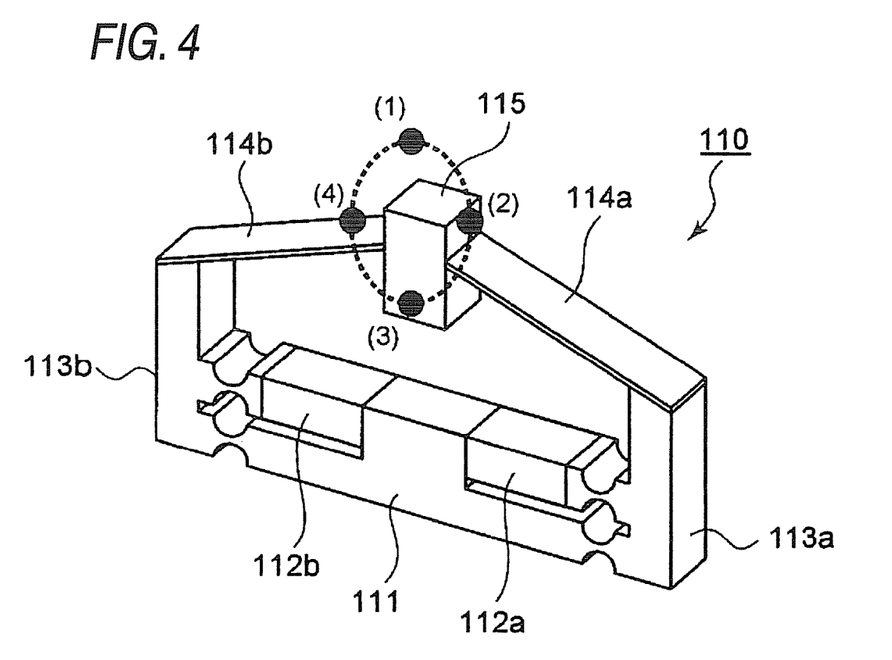
FIG. 4 is a perspective view showing a motion of a actuating portion of the piezoelectric motor shown in FIG. 1.

FIG. 1 is a perspective view showing a structure of a piezoelectric motor according to a first embodiment. FIGS. 2 to 4 are views for explaining an operation of the piezoelectric motor shown in FIG. 1. FIG. 2 is a perspective view showing a moving direction of each portion from a first state (1) to a fourth state (4) in the piezoelectric motor shown in FIG. 1. FIG. 3 is a graph showing a temporal variation in a driving voltage to be applied to a piezoelectric element of the piezoelectric motor shown in FIG. 1. FIG. 4 is a perspective view showing a movement of an actuating portion of the piezoelectric motor shown in FIG. 1.

Figure 5:
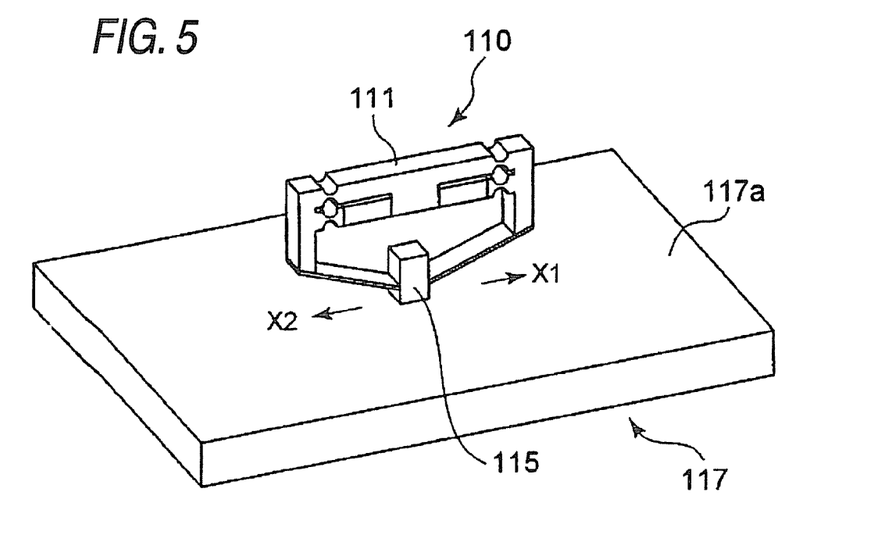
FIG. 5 is a perspective view showing a situation in which the piezoelectric motor shown in FIG. 1 is used in an in-plane straight actuating operation of a planar driven member.
Figure 6:
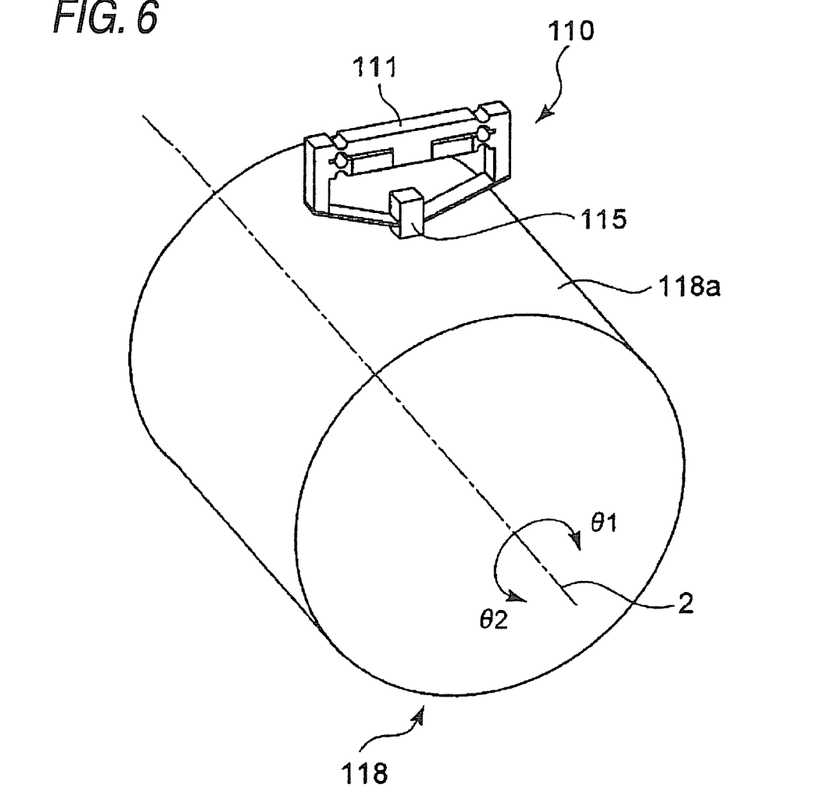
FIG. 6 is a perspective view showing a situation in which the piezoelectric motor of FIG. 1 is used in a rotating and actuating operation of a cylindrical driven member.

Moreover, FIG. 5 is a perspective view showing a situation in which the piezoelectric motor shown in FIG. 1 is used in an in-plane straight actuating motion of a planar driven member, illustrating an example in which a direct advancing type piezoelectric motor is configured by a driven member having a plate-shaped driven surface supported by a bearing (not shown) so as to enable a direct actuating operation. FIG. 6 is a perspective view showing a situation in which the piezoelectric motor shown in FIG. 1 is used in a rotating and actuating operation of a cylindrical driven member, illustrating an example in which a rotating type piezoelectric motor is configured by using a driven member having a driven surface having a shape of a cylindrical surface which is supported rotatably around a rotating shaft through a bearing (not shown).

In a piezoelectric motor 110, a first piezoelectric element 112a and a second piezoelectric element 112b are provided symmetrically with respect to a piezoelectric fixing portion 111a of a base 111. The first piezoelectric element 112a and the second piezoelectric element 112b have reverse operating directions to each other, and one of ends thereof is coupled to the base 111. Moreover, the other ends of the piezoelectric elements 112a and 112b are coupled to constitute a power point 11, and both ends of the base 111 are provided with a first displacement enlarging mechanism 113a and a second displacement enlarging mechanism 113b which have a fulcrum 12 based on the principles of a lever.

The power point 11 and the fulcrum 12 have notch structures having arc shapes, for example, and desirably have such a support structure as to permit a minute rotating displacement with an actuating displacement of each of the piezoelectric elements 112a and 112b. The displacement enlarging mechanisms 113a and 113b enlarge the actuating displacements of the piezoelectric elements 112a and 112b based on the principles of a lever and constitute an action point 13. When a distance between the power point 11 and the fulcrum 12 is represented by L1 and a distance between the action point 13 and the fulcrum 12 is represented by L2, a displacement enlarging ratio is determined by a ratio of the distances of L2/L1 and is properly selected depending on the design of individual applied apparatuses.

The piezoelectric motor 110 is provided with a first leaf spring mechanism 114a and a second leaf spring mechanism 114b which are obtained by coupling the action points 13 of the displacement enlarging mechanisms 113a and 113b to ends and coupling the other ends to a common actuating portion 115. The actuating portion 115 serves to transmit a driving force to driven members 117 and 118 through a friction by a composite vibration generated via each of components of the displacement enlarging mechanisms 113a and 113b and the leaf spring mechanisms 114a and 114b based on the actuating displacements of the piezoelectric elements 112a and 112b. The driven members 117 and 118 will be described below with reference to FIGS. 5 and 6.

FIG. 2 shows an operation sequence of the piezoelectric motor 110. FIG. 3 shows driving voltage waveforms of the piezoelectric elements 112a and 112b, illustrating driving voltages 116a and 116b of the piezoelectric elements 112a and 112b. Moreover, FIG. 4 shows a condition of an elliptic motion of the actuating portion 115. Sine waves having different phases from each other by 90 degrees are set to be the driving voltages 116a and 116b. In the case in which the driving voltage 116b is delayed in a phase of 90 degrees with respect to the driving voltage 116a as shown in FIG. 3, an elliptic motion shown in FIG. 4 can be obtained. In other words, when the driving voltage is applied to the piezoelectric element 112a as a step (2) shown in FIG. 3, the actuating portion 115 is moved downward in a rightward direction in the drawing from a position in step (1) as shown in step (2) shown in FIG. 2 depending on the actuating displacement on the action point 13 of the displacement enlarging mechanism 113a. This is achieved by utilizing the bending deformation of the leaf spring mechanisms 114a and 114b. Subsequently, the operation of step (2)->step (3)->step (4)->step (1)->step (2) in the drawing is repeated so that the elliptic motion is obtained in the same manner.

According to the structure in which the driven member (not shown) is urged downward from above in FIG. 4, the elliptic motion is performed with the actuating portion 115 abutting on the driven member and a driving force is transmitted from the actuating portion 115 through a friction to the driven member by the motion so that the driven member is rotated or directly driven.

FIG. 5 is a perspective view showing a situation in which the piezoelectric motor 110 in FIG. 1 is used in the in-plane straight actuating operation of the driven member 117. The driven member 117 has a plate-shaped driven surface 117a and is supported to be linearly movable in a planar direction of the driven surface 117a. Although FIG. 3 shows the case in which the driving voltage 116b is delayed by a phase of 90 degrees with respect to the driving voltage 116a, it is possible to electrically and easily control direct driving directions X1 and X2 of the driven member 117 shown in FIG. 5 by selectively switching the case in which the driving voltage 116b is advanced by a phase of 90 degrees with respect to the driving voltage 116a.

FIG. 6 is a perspective view showing a situation in which the driven member 118 is rotated and driven by using the piezoelectric motor 110 in FIG. 1. The driven member 118 has a driven surface 118a having a shape of a cylindrical surface and is supported rotatably around a rotating shaft 2. In this case, a control in a rotating direction is performed so that rotating and driving directions θ1 and θ2 can be electrically controlled easily. A driving speed can be regulated based on voltage values (vibrating displacements) of the driving voltages 116a and 116b. Moreover, it is also possible to make a difference between the voltage values (vibrating displacements) of the driving voltages 116a and 116b depending on a driving direction of the driven member 118.

Although the elliptic motion of the actuating portion 115 has been described with reference to FIGS. 2 to 4, the elliptic motion is not restricted but another well-known method, for example, an actuating method using a rapid deforming motion may be employed. In the case in which a larger moving amount than the actuating displacements of the displacement enlarging mechanisms 113a and 113b is to be applied to the driven members 117 and 118, furthermore, the application is executed by a high speed feeding operation (a coarse motion) through a repetition of the elliptic motion or the rapid deforming motion. In the case in which fine positioning is to be performed within the actuating displacements of the displacement enlarging mechanisms 113a and 113b, it is preferable to perform an ultrafine moving operation through a linear motion performed by using the expanding and contracting displacements of the piezoelectric elements 112a and 112b themselves. For a combinational driving principle of the piezoelectric element for performing a coarse and fine motion through the rapid deforming motion and the linear motion, it is possible to use a well-known method as those disclosed in JP-A-3-166081, for example.

Figures 7A, 7B:
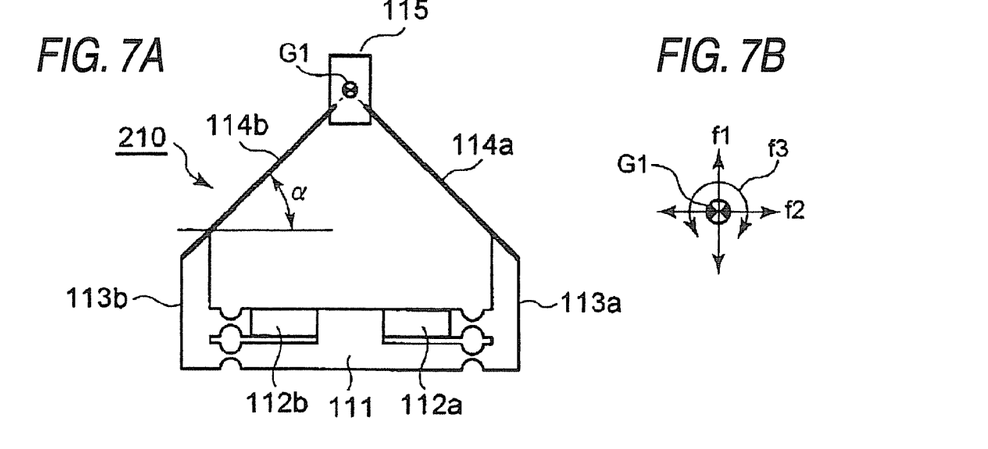
FIG. 7A is a front view showing an example of a positional relationship between a leaf spring mechanism and a actuator in the piezoelectric motor shown in FIG. 1.
FIG. 7B is an explanatory view showing a frequency of a force in each direction which is applied to a center of gravity of the actuator shown in FIG. 7A.

FIG. 7A is a front view showing an example of a positional relationship between the leaf spring mechanism and the actuator in the piezoelectric motor shown in FIG. 1, and FIG. 7B is an explanatory view showing a frequency of a force in each direction which is applied to a center of gravity G1 in the actuator shown in FIG. 7A. A piezoelectric motor 210 shown in FIG. 7A is constituted in a relationship in which an angle α formed by the displacement enlarging mechanisms 113a and 113b and the leaf spring mechanisms 114a and 114b is approximately 45 degrees in the drawing and a positional relationship in which an intersection point on extended lines of the leaf spring mechanisms 114a and 114b and the center of gravity G1 of the actuating portion 115 are almost coincident with each other.

There is obtained a vibration characteristic in which a natural frequency f1 in a vertical direction in the drawing of the actuating portion 115 in the piezoelectric motor 210 is almost coincident with a natural frequency f2 in a transverse direction in the drawing, and a torsional natural frequency f3 around the center of gravity G1 of the actuating portion 115 is different from the natural frequencies f1 and f2. By almost adapting the driving frequencies of the piezoelectric elements 112a and 112b to the natural frequencies f1 and f2, it is possible to utilize a structural resonance, thereby enlarging the actuating displacement. In addition, it is possible to suppress a torsional vibration around the center of gravity G1 of the actuating portion 115.

Figures 8A, 8B:
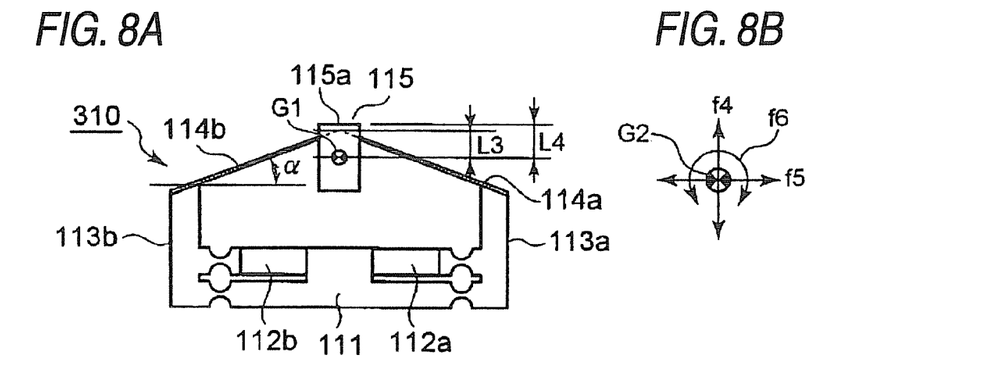
FIG. 8A is a front view showing a different example from FIG. 7A, illustrating the positional relationship between the leaf spring mechanism and the actuator in the piezoelectric motor shown in FIG. 1.
FIG. 8B is an explanatory view showing a frequency of a force in each direction which is applied to the center of gravity of the actuator shown in FIG. 8A.

FIG. 8A is a view showing a different example from that shown in FIG. 7A, illustrating the positional relationship between the leaf spring mechanism and the actuator in the piezoelectric motor shown in FIG. 1. FIG. 8A is a front view showing the piezoelectric motor and FIG. 8B is an explanatory view showing a frequency of a force in each direction which is applied to a center of gravity G2 of the actuator shown in FIG. 8A.

A piezoelectric motor 310 shown in FIG. 8 is constituted in a relationship in which the angle α formed by the displacement enlarging mechanisms 113a and 113b and the leaf spring mechanisms 114a and 114b is smaller than 45 degrees and the intersection point on the extended line of the leaf spring mechanisms 114a and 114b is separated outward by a distance L3 from the center of gravity G2 of the actuating portion 115. The center of gravity G2 of the actuating portion 115 is provided apart from a actuating surface 115a of the actuating portion 115 by a distance L4, and a relationship of L3<L4 is desirable. There is obtained a vibration characteristic in which a natural frequency f4 in the vertical direction in the drawing of the actuating portion 115 in the piezoelectric motor 310 is almost coincident with a torsional natural frequency f6 around the center of gravity G2 of the actuating portion 115 and a natural frequency f5 in the transverse direction of the drawing is different from the natural frequencies f4 and f6. By almost adapting the driving frequencies of the piezoelectric elements 112a and 112b to the natural frequencies f4 and f6, a structural resonance can be utilized so that the actuating displacement is enlarged.

Figures 9A, 9B:
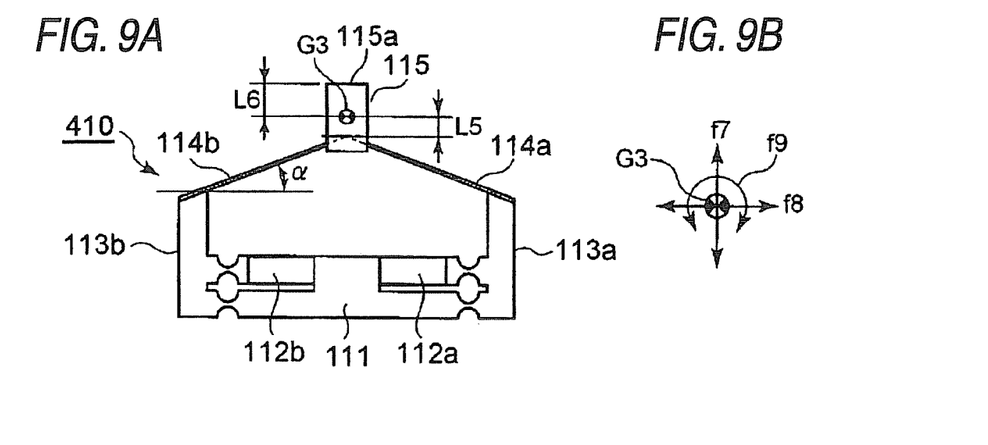
FIG. 9A is a front view showing a different example from FIGS. 7A and 8A, illustrating the positional relationship between the leaf spring mechanism and the actuator in the piezoelectric motor shown in FIG. 1.
FIG. 9B is an explanatory view showing a frequency of a force in each direction which is applied to the center of gravity of the actuator shown in FIG. 9A.

FIG. 9A is a view showing a different example from those shown in FIGS. 7A and 8A, illustrating the positional relationship between the leaf spring mechanism and the actuator in the piezoelectric motor shown in FIG. 1. FIG. 9A is a front view showing the piezoelectric motor, and FIG. 9B is an explanatory view showing a frequency of a force in each direction which is applied to a center of gravity of the actuator shown in FIG. 9A.

A piezoelectric motor 410 shown in FIG. 9A is constituted in a relationship in which the angle α formed by the displacement enlarging mechanisms 113a and 113b and the leaf spring mechanisms 114a and 114b is smaller than 45 degrees and the intersection point on the extended line of the leaf spring mechanism 114a and 114b is separated inward by a distance L5 from a center of gravity G3 of the actuating portion 115. The center of gravity G3 of the actuating portion 115 is provided apart from the actuating surface 115a of the actuating portion 115 by a distance L6, and a relationship of L5<L6 is desirable. There is obtained a vibration characteristic in which a natural frequency f7 in the vertical direction in the drawing of the actuating portion 115 in the piezoelectric motor 410 is almost coincident with a torsional natural frequency f9 around the center of gravity G3 of the actuating portion 115 and a natural frequency f8 in the transverse direction of the drawing is different from the natural frequencies f7 and f9. By almost adapting the driving frequencies of the piezoelectric elements 112a and 112b to the natural frequencies f7 and f9, a structural resonance can be utilized so that the actuating displacement is enlarged.

According to the first embodiment, the actuating displacement of the piezoelectric motor is enlarged. Consequently, it is possible to absorb the shaft misalignment of the driven member supported on the gimbal mechanism, thereby stabilizing the actuator characteristic to reduce the size of the whole device and to enhance a performance.

Second Embodiment

Next, a piezoelectric motor according to a second embodiment of the invention will be described with reference to FIGS. 10 to 12.

Figure 10:
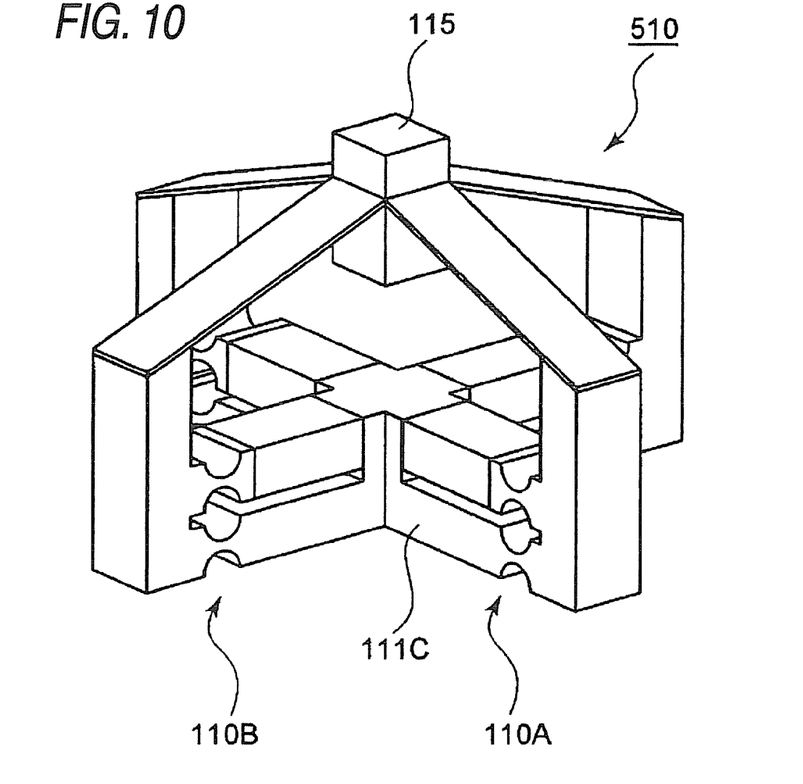
FIG. 10 is a perspective view showing a structure of a piezoelectric motor according to a second embodiment of the invention.
Figure 11:
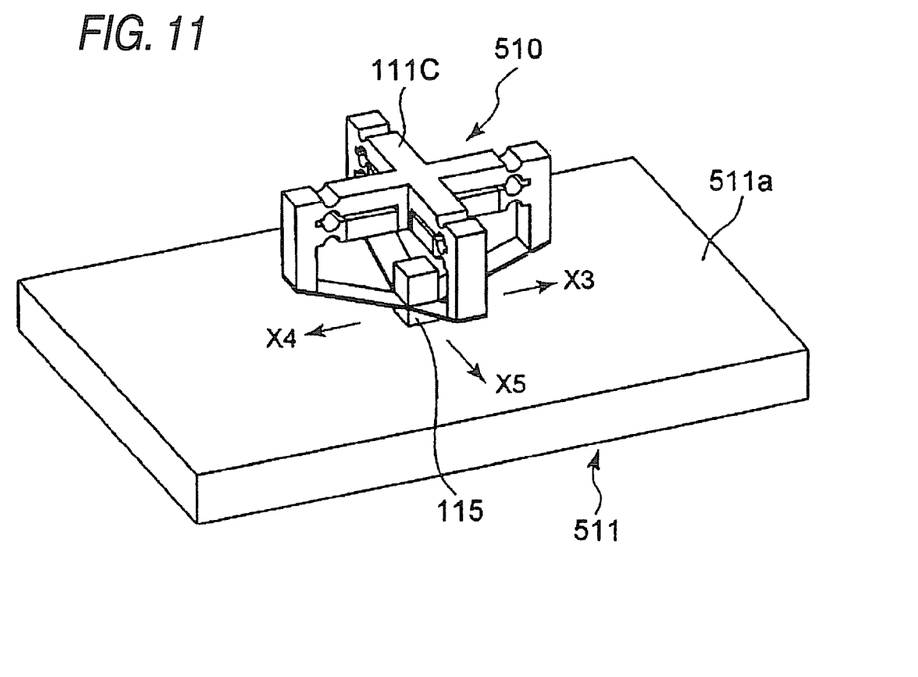
FIG. 11 is a perspective view showing a situation in which the piezoelectric motor of FIG. 10 is used in an in-plane actuating operation of a planar driven member.
Figure 12:
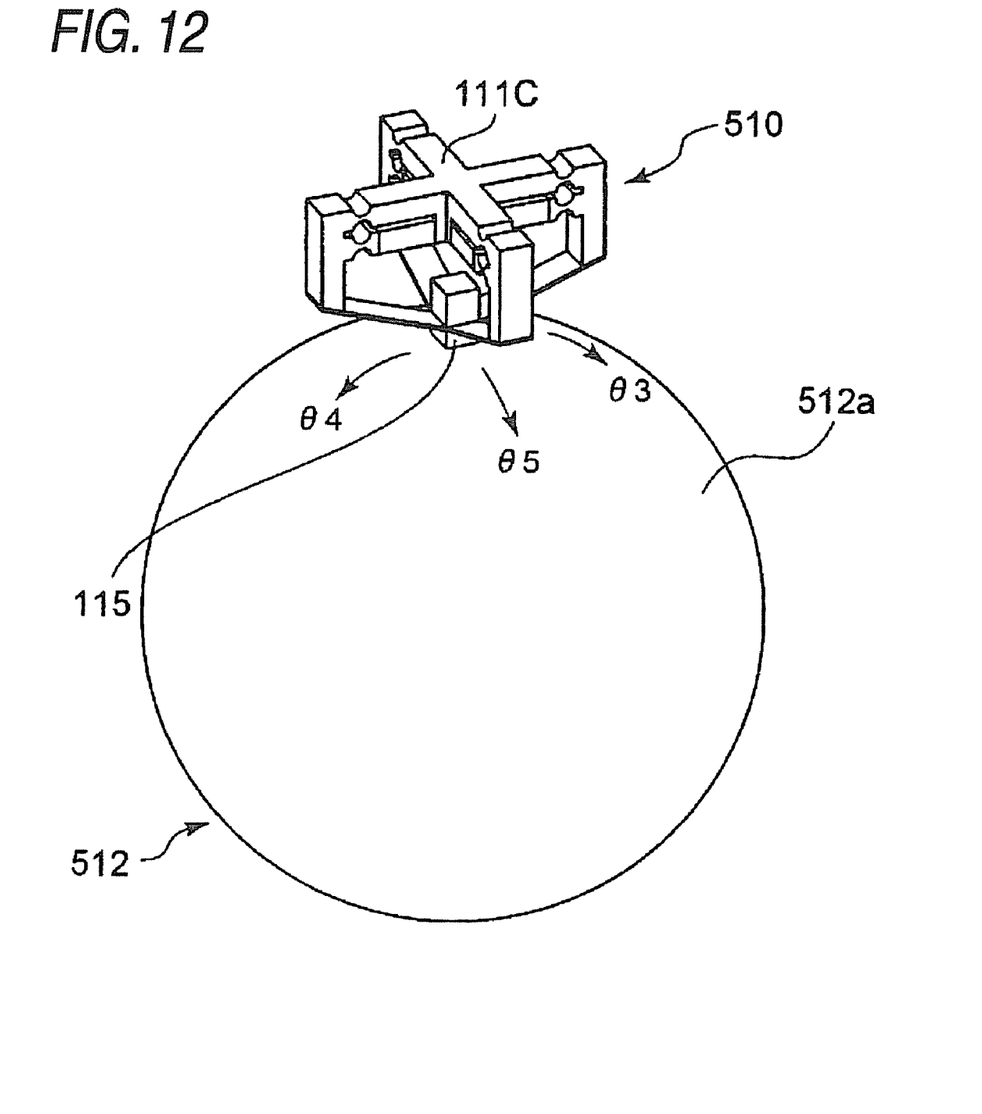
FIG. 12 is a perspective view showing a situation in which the piezoelectric motor shown in FIG. 10 is used in a rotating and actuating operation of a spherical driven member.

FIG. 10 is a perspective view showing a structure of the piezoelectric motor according to the second embodiment, FIG. 11 is a perspective view showing a situation in which the piezoelectric motor shown in FIG. 10 is used in an in-plane actuating operation of a planar driven member, and FIG. 12 is a perspective view showing a situation in which the piezoelectric motor shown in FIG. 10 is used for a rotating and actuating operation of a spherical driven member.

As shown in FIG. 10, a piezoelectric motor 510 is a composite piezoelectric motor having a structure in which a common actuating portion 115 is provided and two pairs of piezoelectric units 110A and 110B are disposed orthogonally to each other. The piezoelectric units 110A and 110B have almost the same structures as the piezoelectric motor 110 according to the first embodiment, respectively. The actuating portion 115 and a base 111C are common to the two pairs of piezoelectric units 110A and 110B respectively. The base 111C is substantially cross-shaped in such a manner that four piezoelectric elements 112aA, 112aB, 112bA and 112bB and four displacement enlarging mechanisms 113aA, 113aB, 113bA and 113bB are fixed apart from one another by 90 degrees.

By independently actuating the piezoelectric units 110A and 110B respectively, it is possible to operate the actuating portion 115 three-dimensionally, thereby performing an elliptic motion or a rapid deforming motion and a linear motion in an optional direction which is controlled. According to a structure in which a driven member (not shown) is urged downward from above in the drawing, the elliptic motion or the quick deforming motion and the linear motion are performed in a state in which the actuating portion 115 abuts on the driven member, and a driving force is transmitted from the actuating portion 115 through a friction to the driven member by the motion so that the driven member is rotated or directly driven.

FIG. 11 is a perspective view showing a situation in which the piezoelectric motor 510 in FIG. 10 is used in an in-plane actuating operation of a driven member 511. As shown in FIG. 11, the driven member 511 has a plate-shaped driven surface 511a. In the example shown in FIG. 11, a biaxial direct advancing type piezoelectric motor is constituted. By changing operations of the piezoelectric units 110A and 110B, direct driving directions X3, X4, X5 and X6 (not shown, a reverse direction to X5) of the driven member 511 shown in FIG. 11 can be electrically controlled easily.

FIG. 12 is a perspective view showing a situation in which the piezoelectric motor 510 shown in FIG. 10 is used in a rotating and actuating operation of a driven member 512. The driven member 512 has a driven surface 512a having a spherical shape. In the example shown in FIG. 12, the piezoelectric motor 510 constitutes a biaxial rotating type piezoelectric motor. Also in this case, a control in a rotating direction is performed in the same manner as in FIG. 11 and rotating and driving directions θ3, θ4, θ5 and θ6 (not shown) can be electrically controlled easily.

Figure 13:
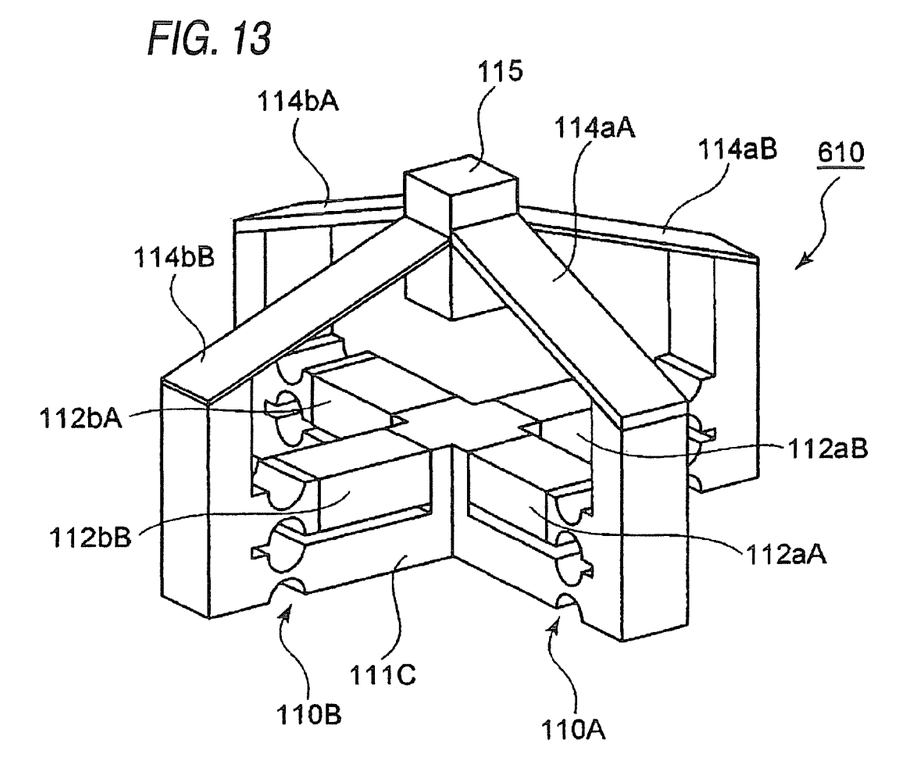
FIG. 13 is a perspective view showing a variant of the piezoelectric motor shown in FIG. 10.

FIG. 13 is a perspective view showing a piezoelectric motor 610 according to a variant of the piezoelectric motor in FIG. 10. The piezoelectric motor 610 constitutes a composite piezoelectric motor in which a common actuating portion 115 is provided and two piezoelectric units 110A and 110B are disposed orthogonally to each other. In leaf spring mechanisms 114aA and 114bA of the piezoelectric unit 110A, a thickness of a leaf spring portion is set to be t1 and a natural frequency constituting a vibrating system of the actuating portion 115 is set to be fA. In leaf spring mechanisms 114aB and 114bB of the piezoelectric motor 110B, moreover, a thickness of a leaf spring portion is set to be t2 and a natural frequency constituting the vibrating system of the actuating portion 115 is set to be fB.

The natural frequencies fA and fB of the piezoelectric units 110A and 110B are set to be different from each other, and driving frequencies DfA and DfB of the piezoelectric units 110A and 110B are operated in the vicinity of the natural frequencies fA and fB, respectively. It is possible to easily regulate the natural frequencies fA and fB by varying the thicknesses t1 and t2 of the leaf spring portions.

Consequently, it is possible to avoid a resonance obtained by combining the piezoelectric units 110A and 110B. Thus, it is possible to independently control the piezoelectric units 110A and 110B, thereby driving the actuating portion 115 in an optional direction.

While the description has been given to the purport that the natural frequencies fA and fB are regulated by varying the thicknesses t1 and t2 of the leaf spring portions, this is not restricted but the regulation may be performed by changing widths of the leaf spring portions or using different materials. For a method of regulating the natural frequencies fA and fB, furthermore, an optimum method is properly selected depending on a design of an applied product.

Third Embodiment

Figure 14:
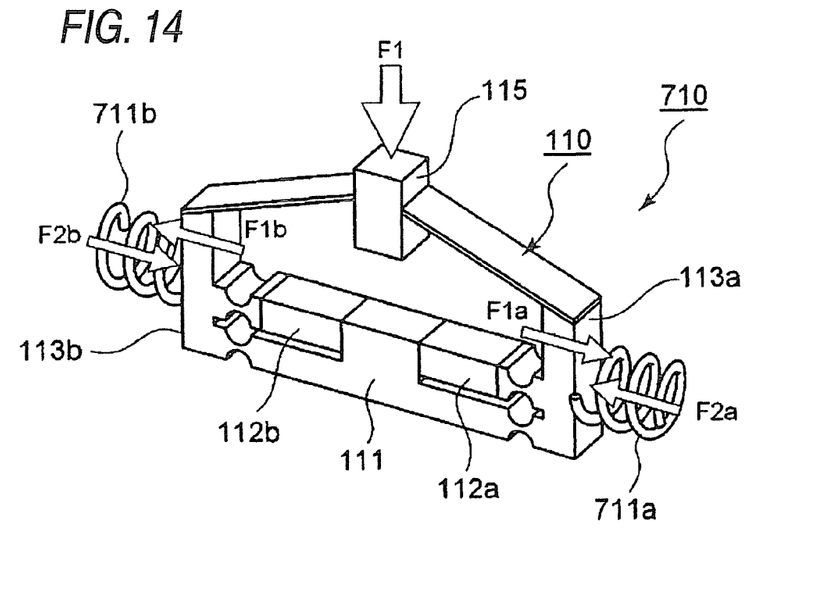
FIG. 14 is a perspective view showing a structure of a piezoelectric motor according to a third embodiment of the invention.

A piezoelectric motor according to a third embodiment of the invention will be described with reference to FIG. 14. FIG. 14 is a perspective view showing a structure of the piezoelectric motor according to the third embodiment. The third embodiment is a variant of the first embodiment and a piezoelectric motor 710 is obtained by adding, to the piezoelectric motor 110 according to the first embodiment, coil springs 711a and 711b for urging displacement enlarging mechanisms 113a and 113b from an outside thereof. Forces F2a and F2b generated from the coil springs 711a and 711b have a relationship of $F1a \leq F2a$ and $F1b \leq F2b$ with respect to component forces F1a and Fib in the displacement enlarging mechanisms 113a and 113b of a force F1 for urging a actuating portion 115 downward from above in the drawing by a driven member (not shown). Moreover, parts for applying pressures to piezoelectric elements 112a and 112b may be added to the forces F2a and F2b generated in the coil springs 711a and 711b.

In general, a conventional piezoelectric motor has such a structure that a driven member and a piezoelectric element (corresponding to the piezoelectric elements 112a and 112b in the embodiment) and a pressure applying mechanism (corresponding to the coil springs 711a and 711b in the embodiment) are disposed in series. Therefore, there is still a problem in that a force to be applied to the piezoelectric element cannot be always optimized if a pressure to be applied to the driven member is optimized.

According to the piezoelectric motor 710 in accordance with the embodiment, the piezoelectric elements 112a and 112b and the coil springs 711a and 711b are disposed in parallel with respect to the driven member. Therefore, it is possible to individually set the pressure to be applied to the driven member and the pressure to be applied to the piezoelectric element. Thus, the whole piezoelectric motor can be regulated optimally.

Fourth Embodiment

Figure 15:
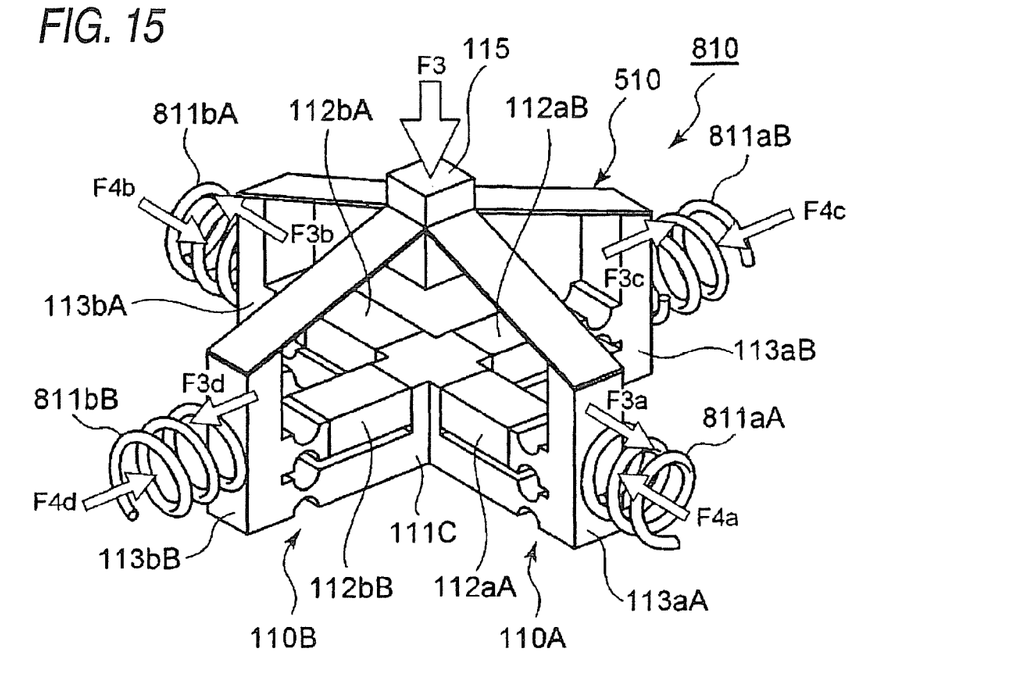
FIG. 15 is a perspective view showing a structure of a piezoelectric motor according to a fourth embodiment of the invention.

A piezoelectric motor according to a fourth embodiment of the invention will be described with reference to FIG. 15. FIG. 15 is a perspective view showing a structure of the piezoelectric motor according to the fourth embodiment. The fourth embodiment is obtained by combining the features of the second and third embodiments. In a piezoelectric motor 810 according to the embodiment, coil springs 811aA, 811bA, 811aB and 811bB for urging the displacement enlarging mechanisms 113aA, 113bA, 113aB and 113bB from an outside thereof are added to the piezoelectric motor 510 according to the second embodiment.

Forces F4a, F4b, F4c and F4d generated in the coil springs 811aA, 811bA, 811aB and 81 1bB have a relationship of $F3a \leq F4a$, $F3b \leq F4b$, $F3c \leq F4c$ and $F3d \leq F4d$ with respect to component forces F3a, F3b, F3c and F3d in the displacement enlarging mechanisms 113aA, 113bA, 113aB and 113bB of a force F3 for urging a actuating portion 115 downward from above in the drawing by a driven member (not shown). Moreover, parts for applying pressures to piezoelectric elements 112aA, 112bA, 112aB and 112bB may be added to the forces F4a, F4b, F4c and F4d generated in the coil springs 811aA, 811bA, 811aB and 811bB.

According to the piezoelectric motor 810 in accordance with the embodiment, in the same manner as in the piezoelectric motor 710 according to the third embodiment (FIG. 14), the piezoelectric elements 112aA, 112bA, 112aB and 112bB and the coil springs 811aA, 811bA, 811aB and 811bB are disposed in parallel with respect to the driven member. Therefore, it is possible to individually set the pressure to be applied to the driven member and the pressure to be applied to the piezoelectric element. Thus, the whole piezoelectric motor can be regulated optimally.

Fifth Embodiment

Figure 16:
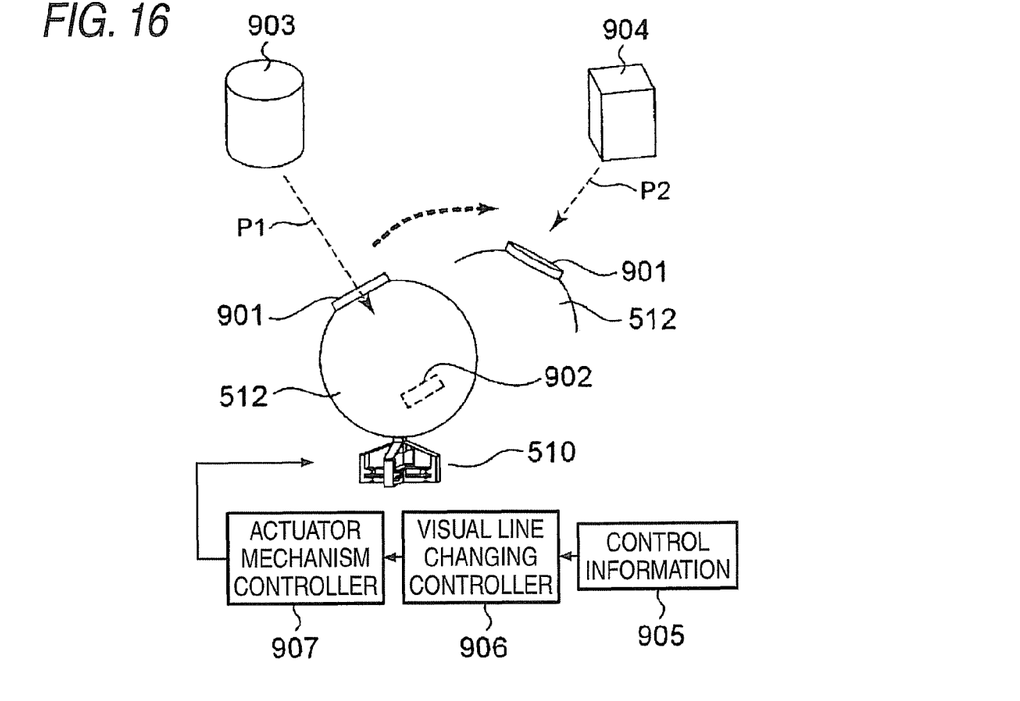
FIG. 16 is a typical perspective view showing a camera device according to a fifth embodiment of the invention.

A camera device according to a fifth embodiment of the invention will be described with reference to FIG. 16. FIG. 16 is a typical perspective view showing the camera device according to the fifth embodiment.

In the camera device shown in FIG. 16, a camera module 901 is mounted on a spherical driven member 512, and the driven member 512 can be rotated in an optional direction by means of a piezoelectric motor 510. For the piezoelectric motor 510, for example, the piezoelectric motor 510 described in the second embodiment is used. As described above, the piezoelectric motor 510 can directly drive the driven member 512 through two rotating shafts. Therefore, it is possible to regulate a direction of an elevation angle and that of an azimuth in the camera module 901.

An object 903 is captured by the camera module 901 and an object light beam P1 reflected from the object 903 is led to the camera module 901 to form an image on an imaging plane 902 of the camera module 901. In the case in which a direction of a visual line of the camera module 901 is to be switched from the object 903 to an object 904, a processing is performed in accordance with a next procedure.

When an operator inputs control information 905 about the object 904, that is, control information 905 about the direction of an elevation angle and that of an azimuth in the camera module 901 and a direction of a rotating angle around a radial axis, visual line changing controller 906 generates an actuating signal for operating each piezoelectric element of the piezoelectric motor 510 based on the control information 905. The actuating signal is input to actuator mechanism controller 907, and the actuator mechanism controller 907 operates each piezoelectric element of the piezoelectric motor 510 to drive the driven member 512. As a result, a direction of a visual line of the camera module 901 is switched into the object 904, the object 904 is captured by the camera module 901, an object light beam P2 reflected from the object 904 is led to the camera module 901, and an image is formed on the imaging plane 902 of the camera module 901.

According to the fifth embodiment, it is possible to implement a biaxial direct actuating operation of the camera module and a reduction in a weight of the driven member including the camera module at the same time, and to expect an implementation of an increase in a speed and an enhancement in accuracy. As a result, it is possible to enhance a control property in a visual line changing function of the camera device, and furthermore, to realize a reduction in a size of the camera device and to make the camera device compact.

Sixth Embodiment

Figure 17:
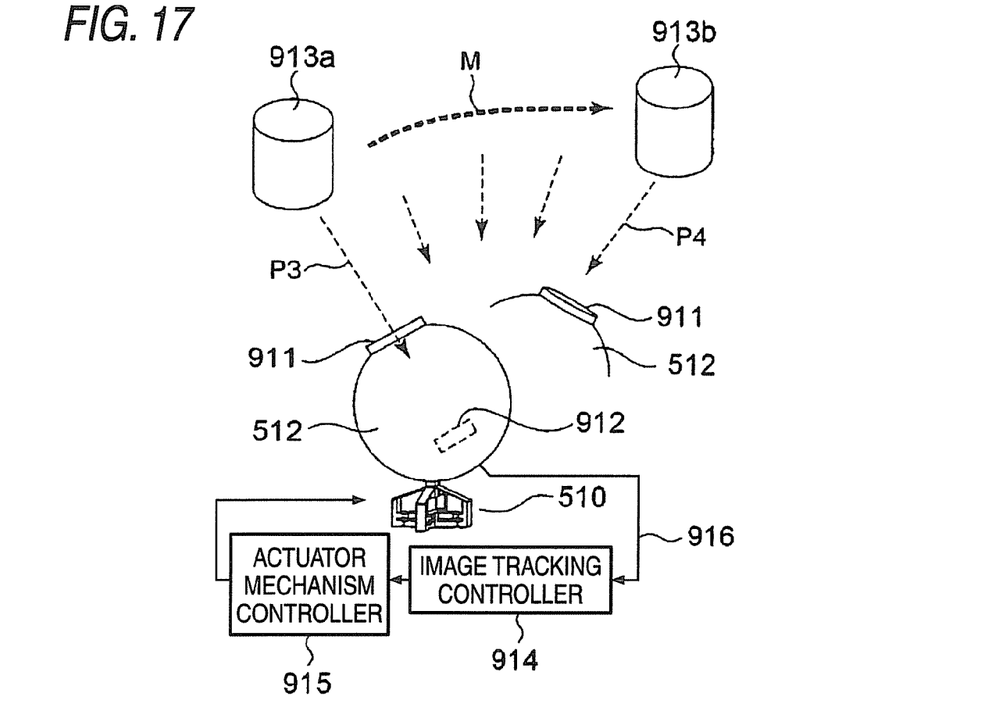
FIG. 17 is a typical perspective view showing a camera device according to a sixth embodiment of the invention.

A camera device according to a sixth embodiment of the invention will be described with reference to FIG. 17. FIG. 17 is a conceptual view showing a structure of the camera device according to the embodiment.

In the camera device of FIG. 17, in the same manner as in the fifth embodiment, a camera module 911 is mounted on a spherical driven member 512, and the driven member 512 can be rotated in an optional direction through a piezoelectric motor 510.

An object 913a is captured by the camera module 911 and an object light beam P3 reflected from the object 913a is led to the camera module 911 to form an image on an imaging plane 912 of the camera module 911.

Furthermore, image tracking controller 914 is provided. The image tracking controller 914 generates an actuating signal for causing a direction of a visual line of the camera module 911 to follow the object 913a in a moving state M of the object 913a based on image information 916 which is captured, that is, an actuating signal for operating each piezoelectric element of the piezoelectric motor 510.

The actuating signal is input to actuator mechanism controller 915, and the actuator mechanism controller 915 operates each piezoelectric element of the piezoelectric motor 510, thereby driving the driven member 512. As a result, the direction of the visual line of the camera module 911 photographs an object 913b after the movement of the object 913a, leads an object light beam P4 reflected from the object 913b to the camera module 911, and forms an image on the imaging plane 912 of the camera module 911.

According to the sixth embodiment, it is possible to implement a biaxial direct actuating operation of the camera module and a reduction in a weight of the driven member including the camera module at the same time, and to expect an implementation of an increase in a speed and an enhancement in accuracy. As a result, it is possible to enhance a control property in an image tracking function of the camera device, and furthermore, to realize a reduction in a size of the camera device and to make the camera device compact.

Seventh Embodiment

Figure 18:
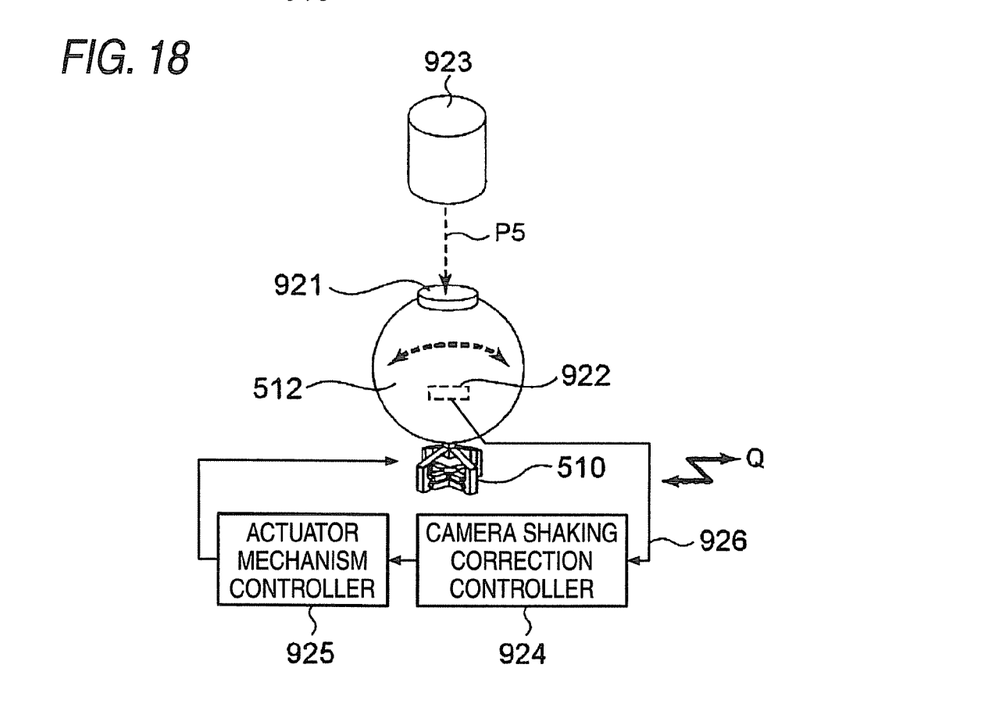
FIG. 18 is a typical perspective view showing a camera device according to a seventh embodiment of the invention.

A camera device according to a seventh embodiment of the invention will be described with reference to FIG. 18. FIG. 18 is a conceptual view showing a structure of the camera device according to the embodiment.

In the camera device shown in FIG. 18, in the same manner as in the fifth and sixth embodiments, a camera module 921 is mounted on a spherical driven member 512, and the driven member 512 can be rotated in an optional direction through a piezoelectric motor 510.

An object 923 is captured by the camera module 921 and an object light beam P5 reflected from the object 923 is led to the camera module 921 to form an image on an imaging plane 922 of the camera module 921. Furthermore, camera shaking correction controller 924 is provided. The camera shaking correction controller 924 prevents image shaking by obtaining an image shaking state Q of the object 923 based on image information 926 which is captured and driving the camera module 921 in vertical and horizontal directions, and generates an actuating signal for canceling the camera shaking, that is, an actuating signal for operating each piezoelectric element of the piezoelectric motor 510.

The actuating signal is input to actuator mechanism controller 925, and the actuator mechanism controller 925 operates each piezoelectric element of the piezoelectric motor 510, thereby driving the driven member 512. As a result, the camera module 921 can obtain a clear image having less shaking.

According to the seventh embodiment, it is possible to implement a biaxial direct actuating operation of the camera module and a reduction in a weight of the driven member including the camera module at the same time, and to expect an implementation of an increase in a speed and an enhancement in accuracy. As a result, it is possible to enhance a control property in a image stabilization function of the camera device, and furthermore, to realize a reduction in a size of the camera device and to make the camera device compact.

Although the image shaking state Q is obtained by using the image information 926 and the actuating signal for canceling the camera shaking vibration is thus obtained in the description, it is also possible to employ a structure in which a sensor for measuring the camera shaking vibration is separately disposed in the camera device body to obtain the actuating signal for canceling the camera shaking vibration based on information of the sensor. In addition, it is also possible to employ such a structure as to obtain the actuating signal for canceling the camera shaking vibration based on both the image information 926 and the information of the sensor for measuring the camera shaking vibration.

Eighth Embodiment

Figure 19:
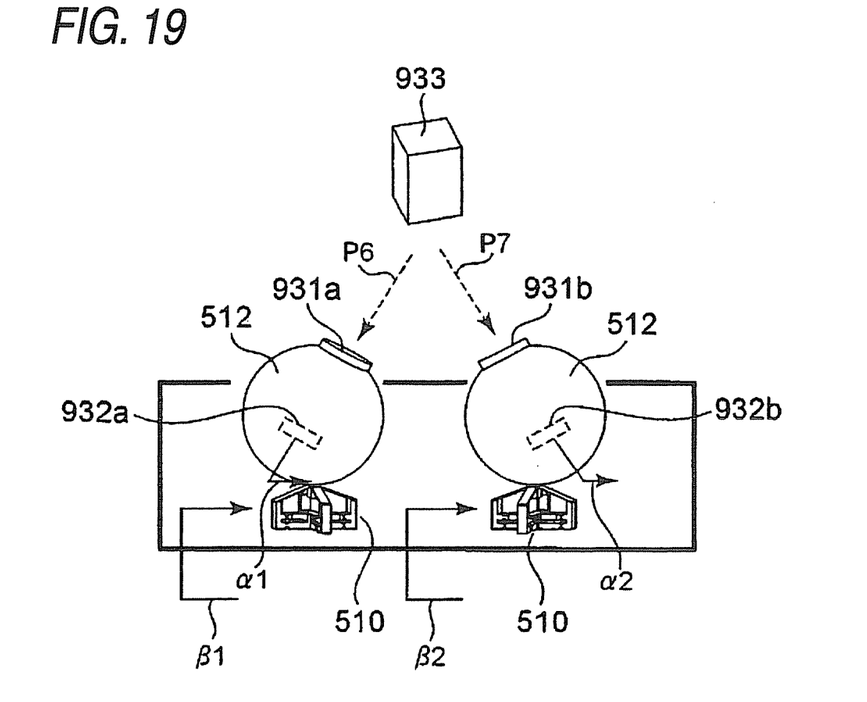
FIG. 19 is a typical perspective view showing a camera device according to an eighth embodiment of the invention.
Figure 20:
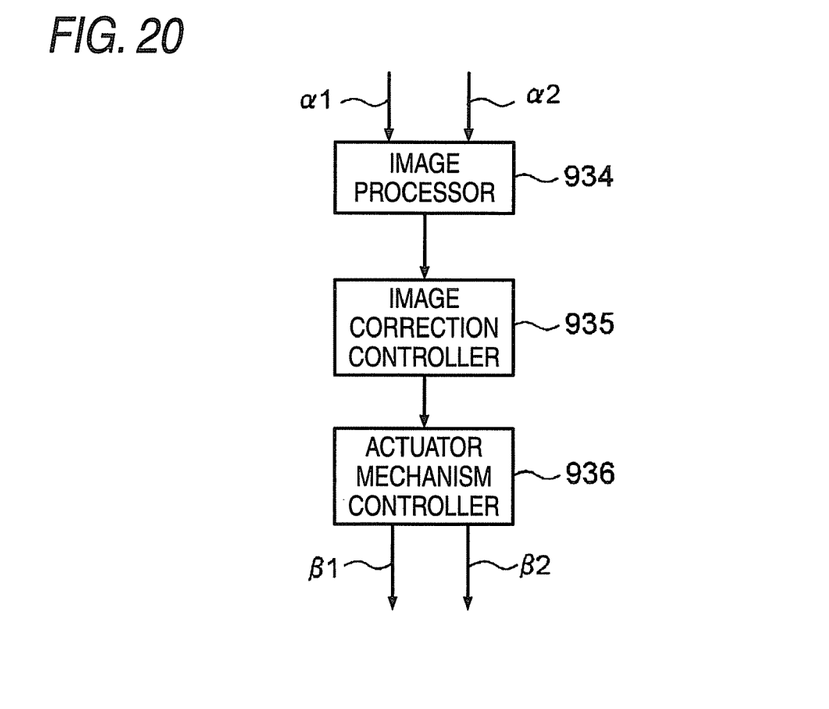
FIG. 20 is a functional block diagram showing a function of a control device for controlling the camera device shown in FIG. 19.

A camera device according to an eighth embodiment of the invention will be described with reference to FIGS. 19 and 20. FIG. 19 is a conceptual view showing a structure of the camera device according to the embodiment. Moreover, FIG. 20 is a functional block diagram showing a function of a control device for controlling the camera device in FIG. 19.

In the camera device of FIG. 19, two camera modules 931a and 931b are mounted on separate driven members 512, and the respective driven members 512 can be rotated in optional directions by separate piezoelectric motors 510 in the same manner as in the fifth to seventh embodiments.

A common object 933 is captured by the two camera modules 931a and 931b which are provided in parallel, and an object light beam P6 reflected from the object 933 is led to the camera module 931a to form an image on an imaging plane 932a of the camera module 931a. Moreover, an object light beam P7 reflected from the object 933 is led to the camera module 931b to form an image on an imaging plane 932b of the camera module 931b.

Furthermore, image processor 934 is provided and images α1 and α2 of the imaging planes 932a and 932b are input to the image processor 934, thereby generating a three-dimensional image. In other words, the three-dimensional image is obtained by the images α1 and α2 in two directions having a parallax in a horizontal direction. Image correction controller 935 analyses the three-dimensional image obtained by the image processor 934 and determines an actuating signal for finely adjusting a shift in a vertical direction which is generated through a zooming operation or focusing of the camera modules 931a and 931b in addition to a fine adjustment for providing a proper three-dimensional image to an observer, that is, a fine adjustment in the horizontal direction. The actuating signal serves to operate each piezoelectric element of the piezoelectric motor 510.

The actuating signal is input to actuator mechanism controller 936, and each piezoelectric element of the piezoelectric motor 510 is operated based on signals β1 and β2 output from the actuator mechanism controller 936 to drive the driven member 512. A parallax adjustment and a shift correction in a vertical direction can be executed at a high speed with high accuracy so that an excellent three-dimensional image can be always provided. As compared with a conventional structure using a pan-tilt mechanism, moreover, it is possible to expect a more reduction in a size and a more compactness of the whole camera device.

It is to be understood that the present invention is not limited to the specific embodiments described above and that the invention can be embodied with the components modified without departing from the spirit and scope of the invention. The invention can be embodied in various forms according to appropriate combinations of the components disclosed in the embodiments described above. For example, some components may be deleted from all components shown in the embodiments. Further, the components in different embodiments may be used appropriately in combination.

What is claimed is:

1. A piezoelectric motor comprising:
a base;
first and second piezoelectric elements that are provided symmetrically on the base to face with each other, the first and second piezoelectric elements being respectively applied with AC driving voltages having a first frequency to actuate in opposite directions;
first and second displacement enlarging mechanisms that respectively enlarge actuating displacements of the first and second piezoelectric elements through first and second levers that rotate around first and second fulcrums fixed to the base;
first and second leaf springs that are respectively coupled to action points of the first and second levers at one ends thereof;
an actuating portion that is coupled to the other ends of the first and second leaf springs and swings in accordance with actuation of the first and the second piezoelectric elements, the actuating portion being urged against a driven member to actuate the driven member with a frictional force between the actuating portion and the driven member; and
first and second external springs that respectively urge the first and second displacement enlarging mechanisms against displacement of the first and second displacement enlarging mechanisms caused by a reaction force received by the actuating portion from the driven member.

2. The motor according to claim 1 further comprising:
third and fourth piezoelectric elements that are provided symmetrically on the base to face with each other, the third and fourth piezoelectric elements being respectively applied with AC driving voltages having a second frequency to actuate in opposite directions that are perpendicular to the actuating directions of the first and second piezoelectric elements;
third and fourth displacement enlarging mechanisms that respectively enlarge actuating displacements of the third and fourth piezoelectric elements of through third and fourth levers that rotate around third and fourth fulcrums fixed to the base; and
third and fourth leaf springs that are respectively coupled to action points of the third and fourth levers at one ends thereof and coupled to the actuating portion at the other ends thereof.

3. The motor according to claim 2 further comprising third and fourth external springs that respectively urge the third and fourth displacement enlarging mechanisms against displacement of the third and fourth displacement enlarging mechanisms caused by the reaction force received by the actuating portion from the driven member.

4. The motor according to claim 1, wherein the actuating portion swings in an elliptic motion that rotates to include a component having a direction to urge the actuating portion toward the driven member and a component having a direction to separate the actuating portion from the driven member.

5. A camera device comprising:
a camera module having a spherical driven portion and an imaging device provided in the spherical driven portion; and
a piezoelectric motor that actuates the spherical driven portion to control the direction of the camera module, the piezoelectric motor including:
a base;
first and second piezoelectric elements that are provided symmetrically on the base to face with each other, the first and second piezoelectric elements being respectively applied with AC driving voltages having a first frequency to actuate in opposite directions;
first and second displacement enlarging mechanisms that respectively enlarge actuating displacements of the first and second piezoelectric elements through first and second levers that rotate around first and second fulcrums fixed to the base;
first and second leaf springs that are respectively coupled to action points of the first and second levers at one ends thereof;
an actuating portion that is coupled to the other ends of the first and second leaf springs and swings in accordance with actuation of the first and the second piezoelectric elements, the actuating portion being urged against the spherical driven member to actuate the spherical driven member with a frictional force between the actuating portion and the spherical driven member; and
first and second external springs that respectively urge the first and second displacement enlarging mechanisms against displacement of the first and second displacement enlarging mechanisms caused by a reaction force received by the actuating portion from the driven member.

* * * * *